(12) United States Patent
Carter et al.

(10) Patent No.: US 8,806,014 B2
(45) Date of Patent: Aug. 12, 2014

(54) TECHNIQUES FOR INTELLIGENT SERVICE DEPLOYMENT

(75) Inventors: Stephen R Carter, Spanish Fork, UT (US); Jason Allen Sabin, Lehi, UT (US); Michael John Jorgensen, Mapleton, UT (US); Nathaniel Brent Kranendonk, Springville, UT (US); Kal A. Larsen, Springville, UT (US)

(73) Assignee: Novell, Inc., Provo, UT (US)

( * ) Notice: Subject to any disclaimer, the term of this patent is extended or adjusted under 35 U.S.C. 154(b) by 384 days.

(21) Appl. No.: 12/790,335

(22) Filed: May 28, 2010

(65) Prior Publication Data

US 2011/0231552 A1    Sep. 22, 2011

Related U.S. Application Data

(60) Provisional application No. 61/315,869, filed on Mar. 19, 2010.

(51) Int. Cl.
*G06F 15/173* (2006.01)
*G06F 17/00* (2006.01)
*G06G 7/00* (2006.01)

(52) U.S. Cl.
USPC ............ 709/226; 709/224; 709/238; 705/400

(58) Field of Classification Search
None
See application file for complete search history.

(56) References Cited

U.S. PATENT DOCUMENTS

| | | | |
|---|---|---|---|
| 6,910,024 B2* | 6/2005 | Krishnamurthy et al. | 705/400 |
| 7,467,225 B2* | 12/2008 | Anerousis et al. | 709/238 |
| 7,526,764 B2* | 4/2009 | Fanshier | 717/174 |
| 2006/0080413 A1 | 4/2006 | Oprea et al. | |
| 2010/0235355 A1* | 9/2010 | Carter et al. | 707/736 |
| 2011/0153824 A1* | 6/2011 | Chikando et al. | 709/226 |
| 2012/0311012 A1* | 12/2012 | Mazhar et al. | 709/201 |

* cited by examiner

*Primary Examiner* — Wen-Tai Lin
(74) *Attorney, Agent, or Firm* — Schwegman, Lundberg & Woessner, P.A.

(57) ABSTRACT

Techniques for intelligent service deployment are provided. Cloud and service data are evaluated to develop a service deployment plan for deploying a service to a target cloud processing environment. When dictated by the plan or by events that trigger deployment, the service is deployed to the target cloud processing environment in accordance with the service deployment plan.

6 Claims, 4 Drawing Sheets

TECHNIQUES FOR INTELLIGENT SERVICE DEPLOYMENT

RELATED APPLICATIONS

The present application is a non-provisional application of and claims the benefit of priority under 35 U.S.C. 119(e) to U.S. Provisional Patent Application Ser. No. 61/315,869, filed Mar. 19, 2010, and entitled "Techniques for Intelligent Service Deployment;" the disclosure of which is incorporated herein by reference in its entirety.

BACKGROUND

The future of cloud computing will be realized when the cloud is a natural extension of what is consider today to be the enterprise data center. The ability to consider multiple cloud providers as a single data center or collection of computing assets will revolutionize the way that modern enterprises run their business. Of most importance to being able to utilize the cloud in this way will be the ability to describe a deployment and service-level agreement for the deployment in reference to a specific business need and have that deployment analyzed and realized in the cloud in an optimal way. This has not been achieved in the art heretofore.

SUMMARY

Various embodiments of the invention provide techniques for intelligent service deployment. Specifically, a method for service deployment is presented. Cloud attribute data for a target cloud processing environment and service attribute data for a service are acquired. Next, a deployment specification is evaluated for deploying the service to the target cloud processing environment. Then, a service placement plan is developed for scheduling the deployment of the service to the target cloud processing environment based on the cloud attribute data, the service attribute data, and the deployment specification. Finally, the service is deployed to the target cloud processing environment in accordance with the service placement plan.

DETAILED DESCRIPTION

Figure 1:
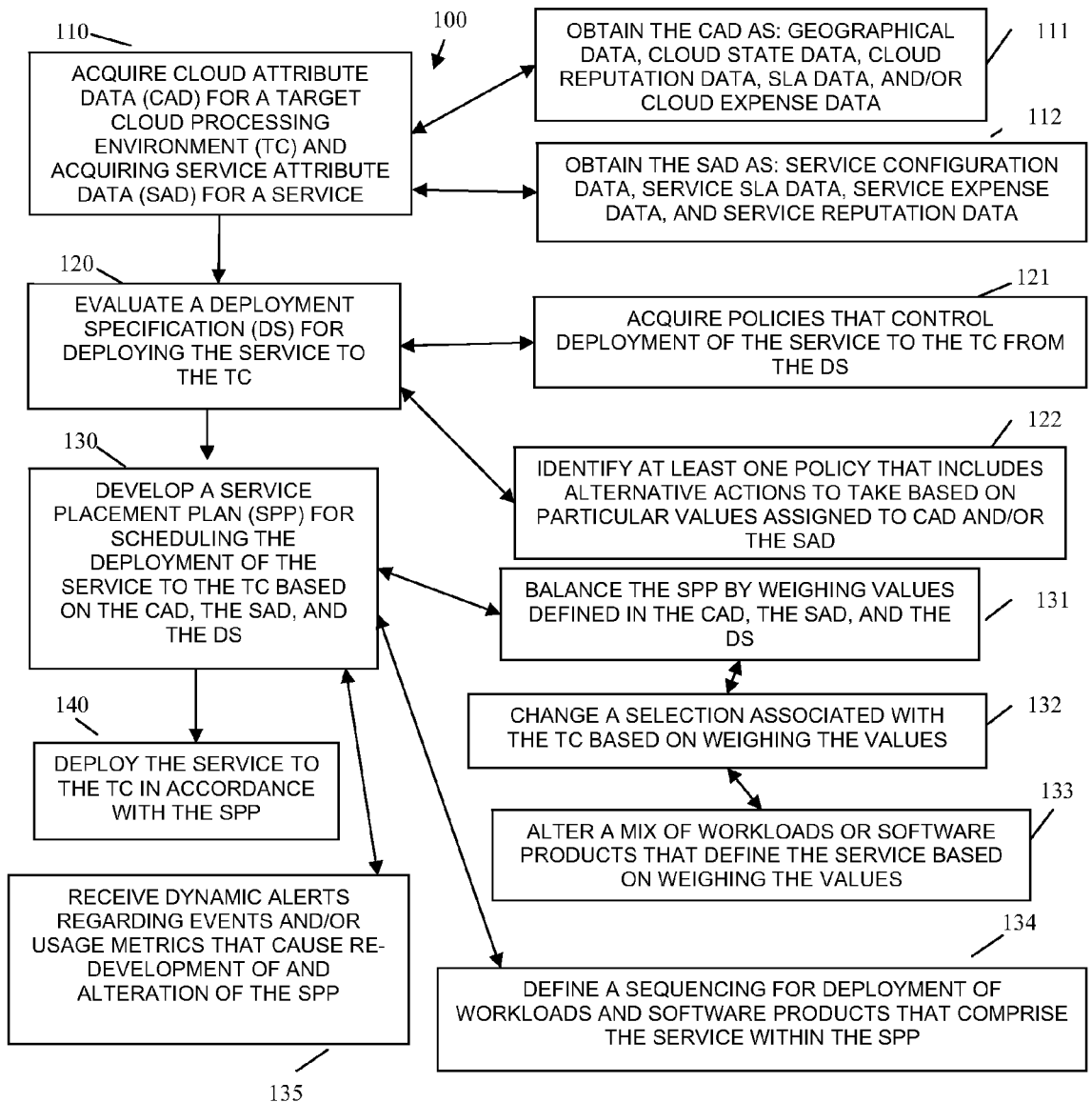
FIG. 1 is a diagram of a method for service deployment, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above. The phrase "software product" refers to independent software products that are independent of the workloads and that provides features to the workloads, such as but not limited to directory services, network services, and the like.

A "workload" refers to a task, a function, and/or a distinct unit of work that is processed within a workflow management system.

A "workload service" refers to the logical association between multiple workloads and software products organized as one logical unit, referred to herein as a "service" or "workload service."

The term "Netgraphy" is used herein to indicate the state of a cloud network, such that messages and packets traveling between processes, storage, and end users can be affected, monitored, and altered. The state or updated stated is a relationship (linkage and association) between geographical data for the cloud network, the attribute data for the cloud network, and metric usage data for the cloud network.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Embodiments and components of the invention are implemented and reside in a non-transitory computer-readable medium that executes on one or more processors that are specifically configured to process the embodiments and components described herein and below.

FIG. 1 is a diagram of a method 100 for service deployment, according to an example embodiment. The method 100 (hereinafter "service planner") is implemented and resides within a non-transitory computer-readable or processor-readable medium that executes on one or more processors of a network. Moreover, the service planner is operational over a network and the network may be wired, wireless, or a combination of wired and wireless.

At 110, the service planner acquires cloud attribute data for a target cloud processing environment. At 110, the service planner also simultaneously acquires service attribute data for a service. The service comprises one or more workloads; each workload defining one or more functions for a workload management system. The service also includes one or more software products; each software product different from the workloads.

According to an embodiment, at 111, the service planner obtains the cloud attribute data as one or more of: cloud geographical data, cloud state data (cloud Netgraphy data), cloud reputation data, and/or cloud expense data. More detail of the types of cloud attribute data is provided below with the discussion of the FIG. 4.

In an embodiment, at 112, the service planner obtains the service attribute data as one or more of: service configuration data, service level agreement data, service expense data, and/or service reputation data. Again, more detail of the types of service data is also provided below with the discussion of the FIG. 4.

At 120, the service planner evaluates a deployment specification for deploying the service to the target cloud processing environment. Greater detail of this evaluation and some specific examples are provided below with the discussion of the FIG. 4.

In one scenario, at 121, the service planner acquires policies that control the deployment of the service to the target cloud processing environment from the deployment specification. That is, the deployment specification defines or identifies policies that are to be followed when evaluating the deployment specification.

In another case, at 122, the service planner identifies at least one policy that includes alternative actions to take based on particular values assigned to the cloud attribute data and/or the service attribute data. An example of this alternative action approach is provided below with reference to the FIG. 4.

At 130, the service planner develops a service placement plan for scheduling the deployment of the service to the target cloud processing environment. This is done based on the cloud attribute data, the service attribute data, and the deployment specification.

According to an embodiment, at 131, the service planner balances the service placement plan by dynamically weighing values defined in the cloud attribute data, the service attribute data, and the deployment specification.

Continuing with the embodiment of 131 and at 132, the service planner changes a selection that is associated with or that identifies the target cloud processing environment based on weighing the values. So, the plan can identify or change the identity of the target cloud processing environment.

Still continuing with the embodiment of 132 and at 133, the service planner alters a mix of workloads or software products that define the service based on weighing the values. Here, the assets or resources that comprise the service can be altered based on weighing the values.

Returning to the embodiment of 130 and at 134, the service planner defines a sequencing order for deploying the workloads and software products that comprise the service within the service placement plan. So, the service planner can define a specific sequencing order for initiating and starting the workloads and software products that comprise the service within the target cloud processing environment by defining the order within the service placement plan.

In another case of 130 and at 135, the service planner receives dynamic alert notifications regarding events and/or usage metrics that cause the service planner to redevelop and alter the service placement plan in a dynamic and real time fashion. This accounts for the dynamic and chaotic condition of cloud assets and the network to ensure the service placement plan is optimized prior to actual service deployment.

At some subsequent time thereafter and at 140, the service planner deploys or causes to be deployed the service to the target cloud processing environment in accordance with the dictates and policies of the service placement plan.

The FIG. 2 now describes in greater detail the actual deployment of the service to the target cloud processing environment in accordance with the service placement plan (can also be referred to as the "plan" or "service deployment plan" herein and below).

Figure 2:
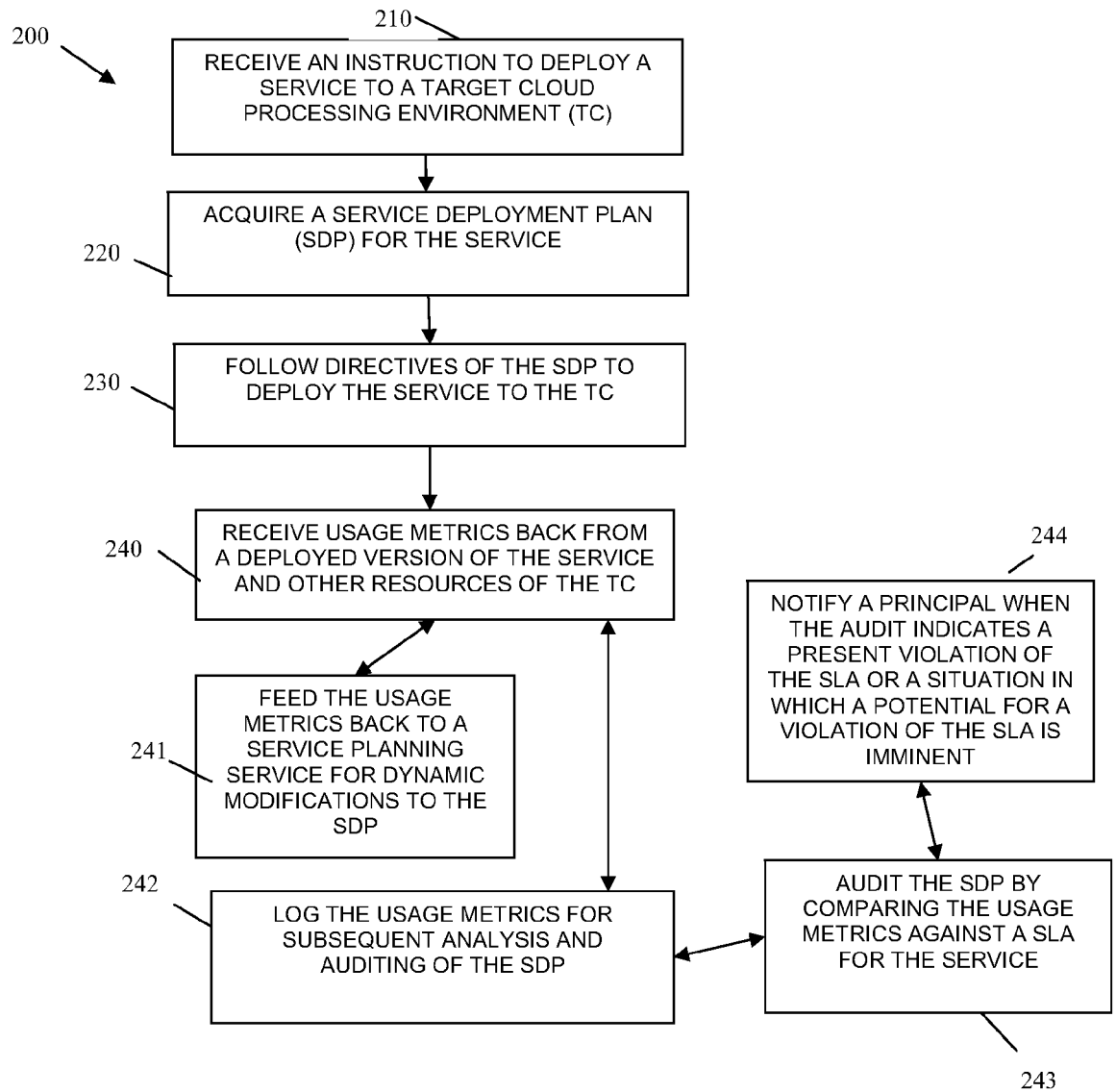
FIG. 2 is a diagram of another method for service deployment, according to an example embodiment.

FIG. 2 is a diagram of another method 200 for service deployment, according to an example embodiment. The method 200 (hereinafter "service deployment manager") is implemented and resides within a non-transitory computer-readable or processor-readable medium that executes on one or more processors of a network. Moreover, the service deployment manager is operational over a network and the network may be wired, wireless, or a combination of wired and wireless.

The service deployment manager presents another and in some cases enhanced perspective of the service planner represented by the method 100 of the FIG. 1 and discussed in detail above. That is, the service planner focuses primarily on the processing associated with developing a service deployment plan whereas the service deployment manager focuses on deploying the service in accordance with the plan.

At 210, the service deployment manager receives an instruction to deploy a service to a target cloud processing environment. This can be done based on a schedule, such as the schedule discussed above with reference to the method 100 of the FIG. 1. This can also be done based on an event raised that according to a policy indicates that the service is to be deployed to a target cloud processing environment.

At 220, the service deployment manager acquires a service deployment plan for the service, such as the service placement plan described above with reference to the method 100 of the FIG. 1.

At 230, the service deployment manager follows the directives of the service deployment plan to deploy the service to the target cloud processing environment.

According to an embodiment at 240, the service deployment manager subsequently receives usage metrics back from a deployed version of the service and other resources of the target cloud processing environment.

Continuing with the embodiment of 240 and at 241, the service deployment manager dynamically feeds the usage metrics back to a service planning service, such as the service planner described above with reference to the method 100 of the FIG. 1, for purposes of dynamically modifying the service deployment plan.

In another case of 240 and at 242, the service deployment manager logs the usage metrics for subsequent analysis and auditing of the service deployment plan.

So, at 243, the service deployment manager can audit the service deployment plan by comparing the usage metrics against a service level agreement for the service and/or the target cloud processing environment.

Continuing with the embodiment of 243 and at 244, the service deployment manager notifies a principal when the audit indicates a present violation of the service level agreement or a situation in which a potential for a violation of the service level agreement is deemed imminent based on policies or threshold value evaluations or comparisons.

Figure 3:
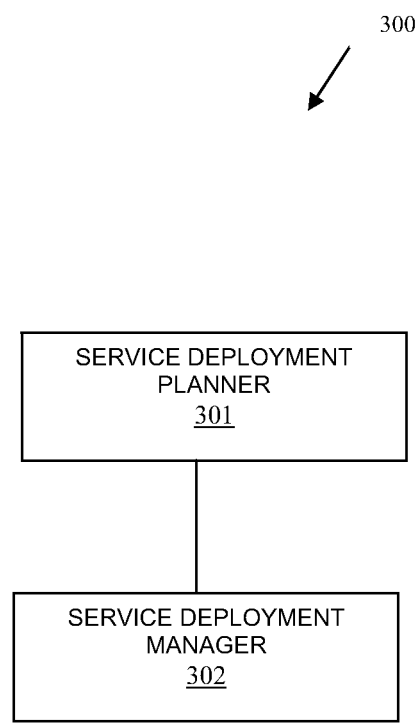
FIG. 3 is a diagram of a service deployment system, according to an example embodiment.

FIG. 3 is a diagram of a service deployment system 300, according to an example embodiment. The components of the intelligent service deployment system 300 are implemented within and reside within an non-transitory and computer or processor-readable storage medium for purposes of executing on one or more processors of a network. The network may be wired, wireless, or a combination of wired and wireless.

The service deployment system 300 implements, inter alia, the method 100 and the method 200 of the FIGS. 1 and 2, respectively.

The intelligent service deployment system 300 includes a service deployment planner 301 and a service deployment manager 302. Each of these components and their interactions with one another will now be discussed in detail.

The service deployment planner 301 is implemented in a non-transitory computer-readable storage medium and executes on one or more processors of the network. Example aspects of the service deployment planner 301 were provided in detail above with reference to the methods 100 and 200 of the FIGS. 1 and 2, respectively.

The service deployment planner 301 is configured to develop a plan for deploying a service to a target cloud processing environment. This is done in response to cloud attribute data and service attribute data (defined above with reference to the methods 100 and 200 of the FIGS. 1 and 2, respectively and defined in greater detail below with reference to the FIG. 4).

According to an embodiment, the service deployment planner 301 is further configured to receive dynamic feedback on usage metrics for the service and the target cloud processing environment for purposes of dynamically modifying and adjusting the plan.

In another case, the service deployment planner 301 is configured to select and initially identify the target cloud processing environment in response to or based on the cloud attribute data and the service attribute data. The cloud attribute data defines attribute data for multiple cloud processing environments including the selected and identified target cloud processing environment.

The service deployment manager 302 is implemented in a non-transitory computer-readable storage medium and executes on one or more processors of the network. Example aspects of the service deployment manager 302 were provided in detail above with reference to the methods 100 and 200 of the FIGS. 1 and 2, respectively.

The service deployment manager 302 is configured to interact with the service deployment planner 301 for purposes of acquiring the plan and deploying the service to the target cloud processing environment in accordance with the directives of the plan.

According to an embodiment, the service deployment manager 302 is further configured to sequence deployment of workloads and software products that comprise the service when the service is being deployed to the target cloud processing environment.

Figure 4:
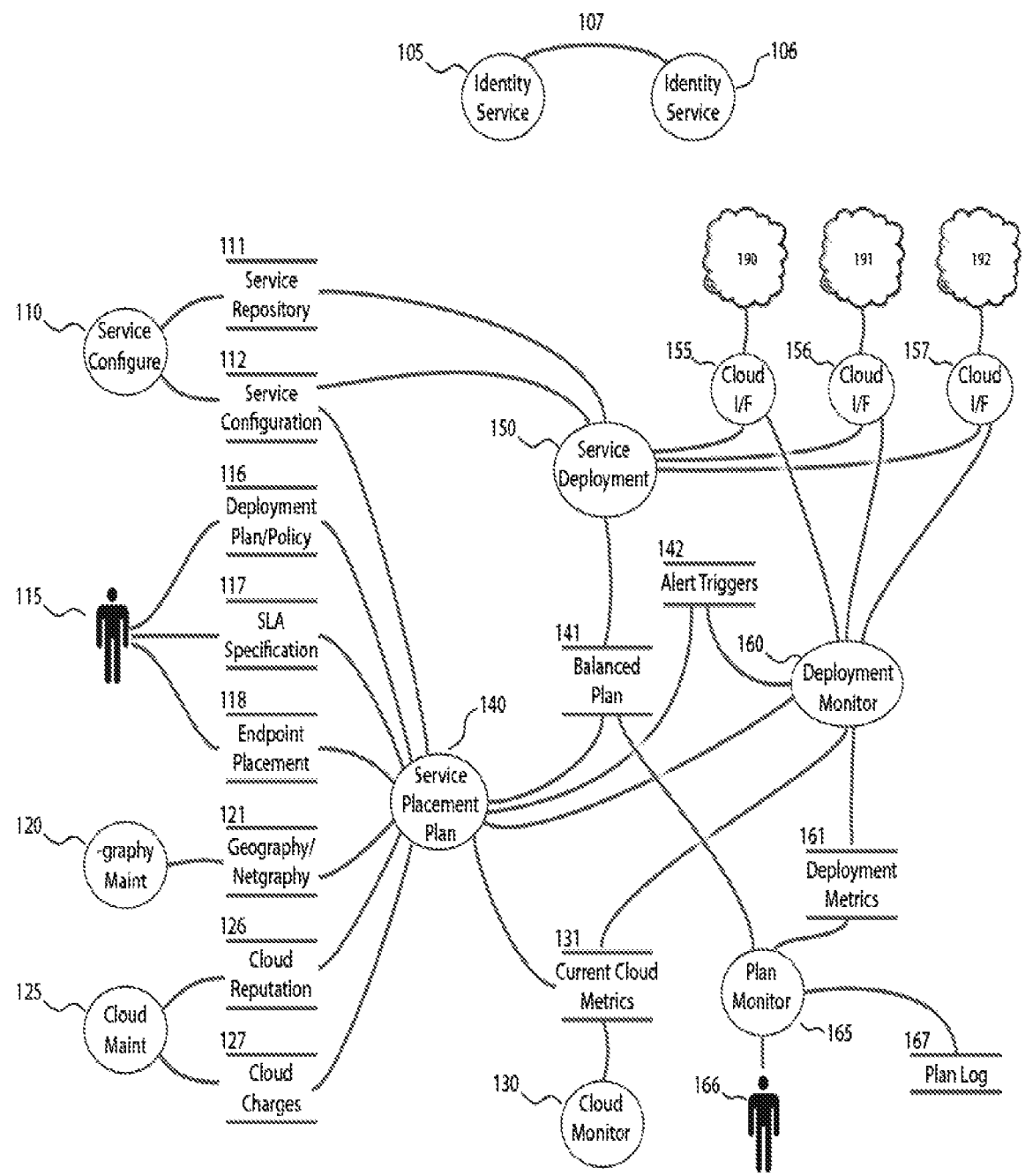
FIG. 4 is a diagram of an example architecture for intelligent service deployment, according to the techniques presented herein.

FIG. 4 is a diagram of an example architecture for managing service definitions in an intelligent workload management system, according to the techniques presented herein.

The FIG. 4 is presented for purposes of illustration and comprehension. It is to be understood that other architectural arrangements can be used to achieve the teachings presented herein and above.

The architecture of the FIG. 4 utilizes an Identity Service at 190. The identity service provides a variety of authentication and policy management services for the components described with reference to the FIG. 4.

Germane to the future of the Internet and cloud computing is the ability to have an indisputable identity. This type of identity relies upon an infrastructure of identity services, which have some type of trust relationship that can be evaluated by policy and enforced at each endpoint by that policy. Identity services in the FIG. 4 are depicted by 105 and 106 with the trust relationship depicted by 107. Of course there can be a plurality of identity services and trust relationships of various descriptions, policy specification, trust specifications, etc.

The embodiments of the FIG. 4 utilize the maintenance of a Service Repository, at 111, and a Service Configuration, at 112, maintained by Service Configure, at 110.

Elements 111 and 112 provide access to configuration and operational images to instantiate a service, which is a collection of multiple workloads. The relationship between each of the workloads and the functionality provided by those relationships is described in 112.

The geography/Netgraphy repository, at 121, is maintained by the process, at 120, which provides the information necessary to locate network resources in a geographic sense and to evaluate responsiveness and other Service Level Agreement (SLA) type metrics in light of a geographic location.

The repositories of Cloud Reputation, at 126, and Cloud Charges, at 127, are maintained by the process, at 125.

Other repositories for Deployment Plan/Policy, at 116, SLA Specification, at 117, and Endpoint Placement, at 118, are all shown being maintained by a process, at 115. The process, at 115, may be an automated process or, as shown in the diagram, a manual process administered by personnel.

The repository, at 116, describes the specification for a plan and the governing policies necessary to adequately describe the deployment. For example, if the deployment plan and policy were developed for a cloud deployment of Novell's GroupWise® product, then the deployment plan would need to take into account Post Office Agents (POA) and Message Transport Agent (MTA) along with other processes and storage that comprise the GroupWise® deployment. The plan describes the specifics of the deployment in light of the license that the end-user has obtained from the owner of the product (in this case Novell) and in light of factors governing the price point expected to be paid for cloud assets along with other considerations. The policy describes what to do if the price point were to rise or fall what type of load factoring and load balance factoring should be taken into account and how geographic and Netgraphy situation should be taken into account for disaster recovery etc.

The repository, at 117, specifies the service-level agreement that the customer is paying for. This specifies response time; fail over characteristics; disaster recovery characteristics; policies governing the changing of the SLA based upon extenuating circumstances; etc. The SLA, at 117, may be structured to specify SLA constraints that are specific to each end-point and time of day (e.g., the SLA for Toronto would have different specifications for 8:00 to 17:00 than from 17:00 to 8:00—as well the specifications for Atlanta would be different from Toronto as a location and temporarily).

The repository, at 118, specifies where each endpoint to be serviced is located geographically and how many clients are within that endpoint. For example, this repository may specify that a given office in Cleveland has 500 users whereas another office in Toronto may have only 10. The expected SLA for each of these offices is contained within 117 whereas 118 specifying where the endpoint are located.

The Service Placement Plan, at 140, takes the information contained in 112, 116, 117, 118, 121, 126, and 127 to develop a balanced plan, at 141. The final balanced plan, at 141, needs to take into account the Netgraphy based upon the geography of the endpoints specified in 118 together with the SLA specification at 117 along with cloud reputation, at 126, and cloud charges, at 127, to determine the best mixing of cloud assets and cloud providers to provide the final balanced plan that represents the deployment plan/policy, at 116. The processing, at 140, then takes into account the information in 112 to determine how many workloads are needed in each of the cloud locations identified in the balanced plan in order to realize the service as a whole. At this point, reevaluation takes place concerning the balanced plan to make sure that the SLA and charge expectations are still in line. This may require several iterations before a final balanced plan, at 141, can be achieved. As well, the processing, at 140, provides a summary of alert triggers, at 142, which specify the major relationships that Deployment Monitor, at 160, should watch for which would materially affect the balanced plan. Likewise, the processing, at 140, takes into account any current cloud metrics, at 131, while making the balanced plan, at 141.

During operation the service placement plan, at 140, may receive alerts from the Deployment Monitor, at 160, which causes a reevaluation of the balanced plan and, therefore, action by 150 to realize the change in the plan.

Once the balanced plan, at 141, is constructed, service deployment, at 150, uses the balanced plan along with service configuration, at 112, and service repository, at 111, to instruct cloud interfaces, at 155, 156, 157, etc. to deploy specific workloads along with the appropriate sequencing of the workloads and sharing of information such as Internet Protocol (IP) addresses so that the balanced plan is realized in each cloud, at 190, 191, and 192.

The cloud interfaces, at 155, 156, and 157, also monitor the workloads and services that have been deployed and report back responsiveness, resources utilized, and other cloud metrics to the deployment monitor, at 160. The deployment monitor, at 160, monitors the information and if an alert trigger occurs notifies the Service Placement Plan, at 140. As well, the processing, at 160, logs the current cloud metrics concerning responsiveness, time to start, costs accrued, etc. for Current Cloud Metrics, at 131, and Deployment Metrics, at 161. The processing, at 160, also has access to the SLA Specification, at 117, (not shown in the FIG. 4) and uses this information and the monitoring information to calculate the compliance of the plan with the SLA. This may cause other triggers to be emitted. It is noted that, in the SLA there is specific performance metrics that need to be achieved. These metrics are calculated to determine things like how many Identity Providers (IDP's) would be needed to achieve 100 logins per second with a max spike of 200 login's per second. The calculations can either be performed dynamically via a testing process, which would actually determine the numbers (i.e., test to see if 2 IDP's can do the SLA performance metric or do we need to bump it up to 3 to achieve the max spike of 200) or previously recorded metrics from other tests.

The Cloud Monitor, at 130, keeps current the Current Cloud Metrics, at 131, for consumption by 140.

The Plan Monitor, at 165, provides a graphical user interface to show the instantiation of the balanced plan, at 141, to a viewer, at 166. As the balanced plan changes, the monitor shows this along with any historical information showing the morphing of the plan as operational characteristics affect it. Likewise, the Plan Monitor, at 165, maintains a Plan Log, at 167, for further analysis concerning the balanced plan.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
   acquiring cloud attribute data for a target cloud processing environment and acquiring service attribute data for a service, wherein the cloud attribute data includes data relevant to the target cloud processing environment for: a cloud reputation, a cloud geography, a cloud state, a cloud service-level agreement, and cloud expense data, and wherein the service attribute data includes data relevant to the service for: service configuration data, a service service-level agreement, a service reputation, and service expense data, and acquiring policies that control deployment of the service to the target cloud processing environment from the deployment specification;
   evaluating a deployment specification for deploying the service to the target cloud processing environment;
   developing a service placement plan for scheduling the deployment of the service to the target cloud processing environment based on the cloud attribute data, the service attribute data, and the deployment specification, and balancing the service placement plan by weighing values defined in the cloud attribute data, the service attribute data, and the deployment specification, and changing a selection associated with the target cloud processing environment based on weighing the values, and altering a mix of workloads or software products that define the service based on weighing the values; and
   deploying the service to the target cloud processing environment in accordance with the service placement plan.

2. The method of claim 1 further comprising, identifying at least one policy that includes alternative actions to take based on particular values assigned to cloud attribute data and/or the service attribute data.

3. The method of claim 1, wherein developing further includes defining sequencing for deployment of workloads and software products that comprise the service within the service placement plan.

4. The method of claim 1, wherein developing further includes receiving dynamic alerts regarding events and/or usage metrics that cause re-development of and alteration of the service placement plan.

5. A method implemented in a non-transitory machine-readable storage medium and processed by one or more processors configured to perform the method, comprising:
   receiving an instruction to deploy a service to a target cloud processing environment;
   acquiring a service deployment plan for the service having attribute data relevant to the target cloud processing environment for: a cloud reputation, a cloud geography, a cloud state, a cloud service-level agreement, and cloud expense data, and the service deployment plan having data relevant to the service for: service configuration data, a service service-level agreement, a service reputation, and service expense data;

following directives of the service deployment plan to deploy the service to the target cloud processing environment; and receiving usage metrics back from a deployed version of the service and other resources of the target cloud processing environment, and, feeding the usage metrics back to a service planning service for dynamic modifications to the service deployment plan, and logging the usage metrics for subsequent analysis and auditing of the service deployment plan, and auditing the service deployment plan by comparing the usage metrics against a service level agreement for the service, and auditing the service deployment plan by comparing the usage metrics against a service level agreement for the service.

6. A system, comprising:

a service deployment planner implemented in a computer-readable storage medium and to execute on one or more processors of a network;

a service deployment manager implemented in a computer-readable storage medium and to execute on one or more processors of the network;

the service deployment planner is configured to develop a plan for deploying a service to a target cloud processing environment in response to cloud attribute data and service attribute data, wherein the cloud attribute data includes data relevant to the target cloud processing environment for: a cloud reputation, a cloud geography, a cloud state, a cloud service-level agreement, and cloud expense data, and wherein the service attribute data includes data relevant to the service for: service configuration data, a service service-level agreement, a service reputation, and service expense data, the service deployment manager is configured to interact with the service deployment planner to acquire the plan and deploy the service to the target cloud processing environment in accordance with directives of the plan, and wherein the service deployment planner is further configured to receive dynamic feedback on usage metrics for the service and the target cloud processing environment to modify the plan, and wherein the service deployment planner is further configured to select and identify the target cloud processing environment in response to the cloud attribute data that defines multiple cloud processing environments and in response to the service attribute data, and wherein the service deployment manager is further configured to sequence deployment of workloads and software products that comprise the service when deploying the service to the target cloud processing environment.

\* \* \* \* \*